L. O. SCHOPP.
VACUUM CAN SEALING MACHINE.
APPLICATION FILED JULY 21, 1919.

1,371,578.

Patented Mar. 15, 1921.
2 SHEETS—SHEET 1.

Witness:
H. L. Farrington

Inventor:
Laurence O. Schopp
by Albert Scheib Attorney

L. O. SCHOPP.
VACUUM CAN SEALING MACHINE.
APPLICATION FILED JULY 21, 1919.

1,371,578.

Patented Mar. 15, 1921.
2 SHEETS—SHEET 2.

Inventor:
Laurence O. Schopp
by Albert Scheible
Attorney

Witness:
R. L. Farrington

UNITED STATES PATENT OFFICE.

LAURENCE O. SCHOPP, OF CHICAGO, ILLINOIS.

VACUUM CAN-SEALING MACHINE.

1,371,578.

Specification of Letters Patent. Patented Mar. 15, 1921.

Application filed July 21, 1919. Serial No. 312,296.

*To all whom it may concern:*

Be it known that I, LAURENCE O. SCHOPP, a citizen of the United States, residing at Chicago, in the county of Cook and State of Illinois, have invented certain new and useful Improvements in Vacuum Can-Sealing Machines; and I do hereby declare the following to be a full, clear, and exact description of the invention, such as will enable others skilled in the art to which it appertains to make and use the same.

My invention relates to appliances in which objects are to be manipulated or subjected to influences different from exterior atmospheric conditions; to the methods of handling the objects and of producing the desired effect upon them; and to methods and means for continuously keeping vacuum chambers or other compartments sealed from the surrounding atmosphere while freely permitting the movement of objects into and out of such chambers or compartments.

In one of its general aspects, my invention aims to provide an inlet or an outlet for a chamber which will afford a hermetic seal while permitting the moving of objects through the sealing portion without reducing the effectiveness of the seal; to provide means for conveying objects through the sealing means into and out of the container, and to provide means actuated by the conveying means for manipulating or operating upon the objects while in the container. Viewed in this aspect, my invention aims to effect the conveying of the objects at a predetermined rate and spacing and to effect the manipulating or acting upon the objects while the latter are at predetermined points or in predetermined condition within the chamber.

In another aspect, my invention relates to the exhausting of air from cans or other containers, and its objects include the providing of effective means for moving each can with a vent in the latter disposed close to a suction nozzle, so that the action of the nozzle may be largely concentrated upon the air in the container. Furthermore, my invention aims to provide simple means for affording a vent in a completely sealed container and for sealing the vent after a predetermined interval of time; also for effectively exhausting air from the container during the said time interval.

In another aspect, my invention aims to provide means for positively conveying entirely sealed containers through a hermetically sealed chamber without rupturing the sealing of the chamber, to provide means for automatically rupturing the sealing of each container while in the chamber and to provide subsequently operated means for restoring the sealing of the container while still within the chamber.

In one of its more particular applications, my invention relates to vacuum canning, its general objects being to greatly cheapen and expedite the procedure. Heretofore, it has been the practice to a large extent in the vacuum-canning of foods or the like, to produce the vacuum and to seal the cans while handling these cans in batches, the vacuum within the container being annulled between the successive batches to permit the emptying and the refilling of the container. That is to say, a series of cans each having a vent opening would be slid into the container, the air would then be exhausted from the entire container including the free space in the cans, the vent opening in each can would be soldered or otherwise sealed while within the container, air would then be admitted to the container, and finally the batch of sealed cans would be removed from the container. This procedure has the serious objection that a considerable proportion of the total time is required for establishing the vacuum in the container as a whole, since the free space in the cans forms only a very small space in proportion to the content of the container, and that a still greater portion of the total time is consumed in inserting the cans in the container and in withdrawing the sealed cans. Moreover, since the entire container had to be exhausted in order to produce the vacuum in the relatively small free space within the cans, a greater part of the power required for producing this vacuum has been wasted.

For such purposes, my invention aims to overcome this waste of time and of power, so as to produce a far more efficiently operating machine and one which will have a far greater capacity in proportion to the labor required for operating it. Furthermore, my invention aims to provide a method and machine affording a continuous operation, so that finished cans can be withdrawn while others are being inserted, while the air is being exhausted from intermediate cans, and while the vent is being sealed in cans from which the air has been exhausted. More particularly, my invention aims to provide a method and appliance whereby the desired vacuum is continuously maintained while the cans are introduced into the container and removed therefrom, thereby saving time and limiting the amount of power required for the exhausting to that required for the free space in the cans. Furthermore, my invention aims to provide simple means for performing the requisite operations while the cans are continuously traveling through the container, so that no time whatever will be wasted by a halting and restarting of the individual cans; also to provide a method and machine whereby the desired operations will be effected entirely automatically upon the cans, so that after the cans have been fed to the machine, they will pass through the same and will be automatically discharged in finished condition, thus requiring only the single and cheap labor needed for feeding the cans to the machine.

Illustrative of my invention, I am picturing herewith a machine showing a desirable embodiment of the same, this machine being shown as arranged for handling cylindrical cans, although I do not wish the scope of my invention to be limited to any particular embodiment, or to the handling of any particular shape or style of container. In accomplishing the objects of my invention according to the illustrated embodiment, I equip the container of the machine with inlet and outlet portions each sealed by a liquid through which the cans are conveyed, this liquid being so disposed and of such a nature as to maintain its seal continuously, while allowing the conveyer to operate through the liquid thereby permitting the desired vacuum to be continuously maintained within the container while cans are passing into and out of the latter. To prevent the sealing liquid from entering the cans fed into the machine through the liquid, I preferably feed each can to the machine while entirely sealed, then rupture the sealing of the can while in the container, exhaust the air from the can, and thereafter restore the sealing of the can before ejecting the latter from the container. Further particulars of my method and of the illustrated embodiment of my appliance, together with further objects of my invention will be apparent from the following specification and from the accompanying drawings, in which drawings—

Figure 5:
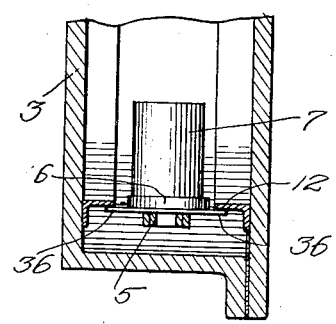
Fig. 5 is a vertical transverse section through the lower end of one of the U-tubes, showing the guides for the conveyer.

In the illustrated embodiment, the machine of my invention includes a casing 1 having a main horizontal bottom portion 2 and having at each end of this bottom portion a downwardly directed tube forming one shank of a substantially U-shaped tube. Extending through these tubes 3 and 4 and through the main portion of the casing 1 is an endless conveyer chain 5 equipped with suitable means, such as clips 6 for firmly gripping the cans 7 which are to be treated in the machine. This conveyer chain 5 is desirably driven by a suitable means disposed outside of the casing, such as a motor 8 having on its shaft a worm 9 engaging a worm wheel 10 on one of the sprocket wheels 11 over which the conveyer chain is guided. The portions of the conveyer chain extending through the U-shaped inlet and outlet tubes are guided by suitable means (such as the angle strips 12 of Fig. 5 which slidably engage lugs 36 on the carrier plates by which the clips 6 are secured to the chain) so that this guiding maintains these chain portions close to the outer part of the tube and thereby affords ample room for the passage of the cans through these tubes.

The portion of the conveyer which happens to be substantially central of the machine is desirably guided so as to slide on the horizontal bottom portion 2 of the casing. When the cans are conveyed over this bottom, they first pass under a cap-puncturing device, then under the nozzle 13 of the pipe 14 which leads to a vacuum pump (not here illustrated) and later under a soldering tool, the aim being to puncture the cap of each can, to have this can traverse a portion of the container with the puncture opening close to the nozzle of the suction pipe, and thereafter to have the soldering tool seal the puncture in the can. Both the puncturing or seal-rupturing part of the machine, and the soldering or seal-restoring part, are timed so as to operate whenever a can is substantially centrally under the same, and desirably are both arranged so that they may operate while the cans are in motion.

For example, the puncturing device may consists of a stem 24 slidably mounted in a guide 15 supported from the top of the casing, and this stem may be reciprocated vertically by a crank arm 16 driven from a pinion 17, which pinion is geared to one of the sprocket wheels 18 that guide the conveyer chain through the container. The wheel 18 and the pinion 17 are so proportioned that the pinion will rotate once in the time that the conveyer chain travels for the distance corresponding to the uniform spacing between the clips holding the cans, and the crank arm 16 is so connected to the pinion 17 that the stem 24 will be in its lowermost position whenever one of the cans is centrally in alinement with the said stem. Pivoted to the stem 24 is a pointed punch 19, which is normally tilted for a limited distance toward the inlet end of the container by a spring 20, but which may swing toward the outlet end of the container against the pressure of this spring.

Figure 2:
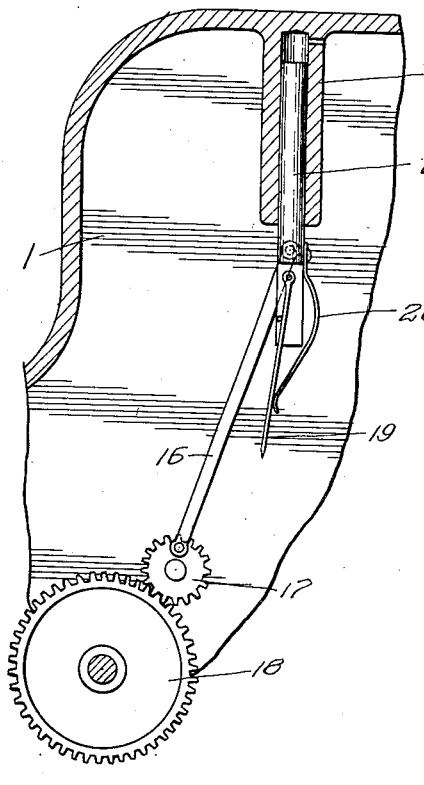
Fig. 2 is an enlarged elevation of the can-puncturing or seal-rupturing portion of the illustrated machine.
Figure 3:
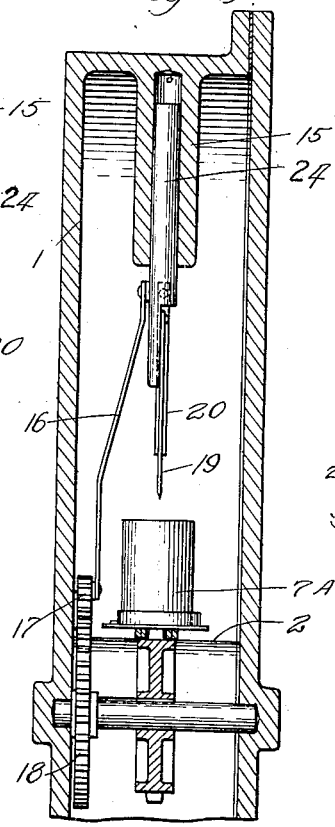
Fig. 3 is an elevation of the same parts, taken at right angles to Fig. 2.
Figure 4:
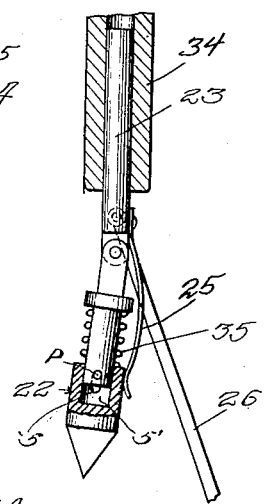
Fig. 4 is an enlarged elevation of the automatic soldering or resealing portion of the illustrated machine.

With the parts thus arranged, the stem 24 will move downward while the can is passing under it, and the tip of the punch 19 will strike the top of the can before the can is centrally under the stem 24. As the can moves on horizontally, the punch 19 continues its downward motion and perforates the cap of the can, and thereafter is gradually retracted from the cap of the can while the punch is swung over against the pressure of the spring 20. As soon as the punch has been raised sufficiently so that its tip clears the cap of the can, the spring 20 swings the punch 19 back to its initial position of Fig. 2, thereby exposing the puncture opening in the cap of the can. The can then travels horizontally under the suction nozzle 13 and with the punctured vent in the cap of the can disposed close to this suction nozzle, so that the air contents of the can can readily be exhausted through this nozzle without appreciably affecting the vacuum in the container.

After having traveled under the suction nozzle for a sufficient interval of time to afford the desired exhausting of air, the can passes under a resealing device which is here shown as consisting of a self-feeding and electrically heated soldering iron 22 pivoted and reciprocated similar to the punch 19. That is to say, the soldering iron 22 may be pivoted to a stem 23 which slides vertically in a guide 34 supported from the top of the container, and the pivoted iron 22 may normally be tilted toward the inlet end of the container by a spring 25. The stem 23 is reciprocated by a crank arm 26 driven from a pinion 27 geared to a sprocket 28 which is intermeshed with a conveyer chain and therefore driven by the latter. These elements are so arranged and proportioned that the soldering iron will move downward close to the perforated cap of the can as the latter passes under it, and will automatically solder the perforation while a spring 35 which urges the iron 22 downwardly on the stem 23' to which the iron is connected by a pin $p$ operating in a slot $s$ in the soldering iron, prevents an undue pressure of the iron toward the can, the iron being permitted to yield upwardly by virtue of the socket $s'$ in the iron 22, and while the yielding of the spring 25 permits the iron to follow the movement of the can; after which the iron is lifted by the stem 23 and swung back to its initial position by the spring 25.

Figure 6:
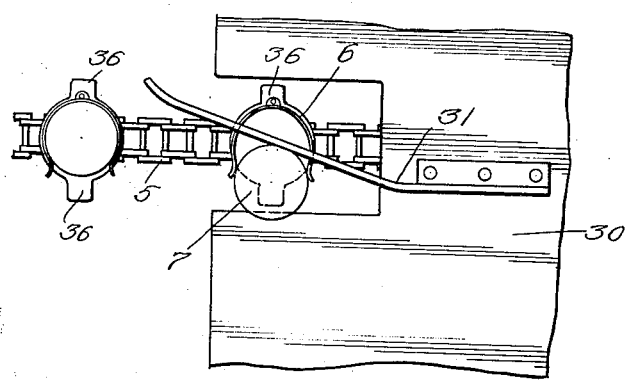
Fig. 6 is a plan view of the rear end of the machine showing means for automatically stripping the cans off the conveyer.

To seal the inlet tube 3 and the outlet tube 4, I provide in each of these tubes a liquid filling 29, which is desirably of a heavy and non-capillary nature, such as mercury, so that it will not stick either to the cans or to the conveyer and clip elements while these are passing through the liquid. At the rear end of the machine, I desirably provide a receiving table 30 and mount adjacent to the same a stripper plate 31 offering an edge oblique to the medial plane of the chain and disposed for forcing each can out of the clip 6 holding the same, after the manner illustrated in Fig. 6. I also desirably provide a feeding table 32 adjacent to the chain at the inlet end of the container from which table the cans can be taken by the operator of the machine and inserted successively in the spring clips 6, or the cans may be automatically fed into the clips by means well known to those interested in the conveyers in the packaging of foods or the like.

In operation, the foods or other articles which are to be placed in the cans are packed in the same and the cans are completely sealed, thereby avoiding the possibility of having the sealing liquid 29 enter the can. Each of the cans is taken from the feeding table 32 and inserted in one of the clips 6 while the conveyer chain is moving continuously in one direction. Thus gripped, each of the cans is carried downwardly and then upwardly through the mercury in the inlet tube 3 and is then guided in the horizontal path over the bottom 2 of the container, which bottom resists the downward thrust of both the puncturing and the soldering devices. As each can passes under the puncturing device, this cap is automatically punctured, thus connecting the interior of the casing with the interior of the container for the time interval during which the can passes between the position of cans 7$^a$ and 7$^b$ in Fig. 1, after which the puncture opening or vent is sealed by the soldering tool, and the resealed can is carried out of the conveyer through the outlet tube 4. Finally, when the can reaches the stripper 31, the edge of the latter acts as a cam in forcing the can out of the clip holding the latter, so that the can is automatically ejected upon the receiving table 30.

With the machine thus arranged, it will be obvious that no expert attendance is required, and that since all elements of the machine are in continuous operation, the actual time required per can is only that needed for insuring the desired vacuum. Moreover, since the only air admitted to the interior of the chamber or casing is the relatively small amount which was in the presealed cans, the vacuum pump only needs to pump out this small quantity of air. As this amount of air is not large with most of the products put up in vacuum cans, I can successfully operate my machine both with a comparatively short suction nozzle and with cans traveling at a considerable speed, thereby obtaining an exceedingly large operative capacity both in proportion to the initial cost of the machine and in proportion to the space occupied by it.

By employing a heavy liquid, such as mercury, for the sealing, I am able to use relatively short U-tubes even when operating at a fairly high vacuum, and by noting the level of the liquid in the outer bend of either U-tube can instantly judge of the degree of vacuum in the casing. Consequently, no auxiliary vacuum gage will be required, and the visible indication afforded by the level of the liquid will effectively prevent an accidental ignoring of a change in the vacuum.

Moreover, since the puncturing of each can while in the casing or chamber connects its interior to the interior of this casing, each can is temporarily subjected to the atmospheric condition within the casing, so that my method and machine need not be limited to vacuum treating, but can be applied for any purpose where it is desirable to subject the interior of the can to such a conditioning action as may pervade the entire interior of the casing into which the can is introduced.

Figure 1:
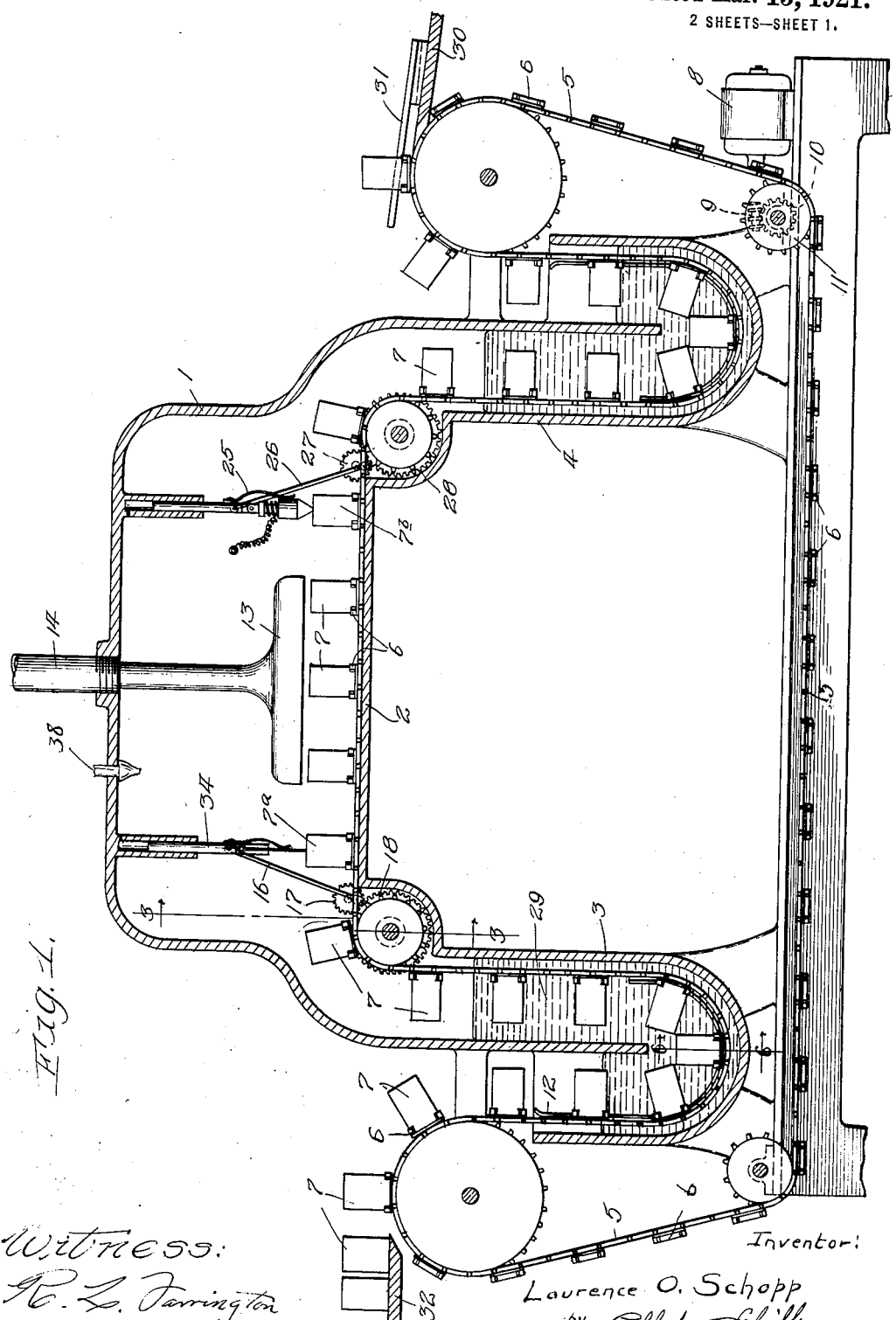
Figure 1 is a vertical, central and longitudinal section through a vacuum canning machine embodying my invention.

For example, a suitable vapor or gas might be injected through the nozzle 38 of Fig. 1 for acting upon materials while these are within the sealed chamber. Likewise, the objects treated or manipulated in the sealed chamber need not be foods or other canned goods, as the seal-maintaining means of my invention will obviously act with equal effectiveness with other objects than cans passing through the same, and the operations performed within the chamber need not be confined to those of unsealing and resealing cans or other containers. Nor do I wish my invention to be confined to the particular resealing device above described (which need not be illustrated in detail, as self-feeding soldering irons are well known in the art) nor even to an automatically operating device (since hand soldering after the manner now employed in vacuum canning might be substituted) nor to the illustrated type of puncturing device, nor to other details of the construction or arrangement here disclosed, it being obvious that the same might be modified in many ways without departing from the spirit of the appended claims.

I claim as my invention:

1. A casing, a U-shaped inlet and a U-shaped outlet for the same; an endless conveyer extending successively through the inlet, the casing and the outlet; guide means associated with the inlet and the outlet for holding the conveyer close to the exterior of the bend of each thereof; and liquids in the inlet and the outlet for continuously sealing the same.

2. The combination with a chamber having an inlet and an outlet each closed by a sealing liquid through which objects may pass, of means extending through the inlet, the chamber and the outlet for conveying objects through the same; and means operated by the conveying means for operating on the objects while in the container.

3. The combination with a chamber having an inlet and an outlet each closed by a sealing liquid through which objects may pass, of means extending through the inlet, the chamber and the outlet for conveying objects through the same; and means operated by the conveying means for operating on each object while at a predetermined position in the container.

4. The combination with a chamber having an inlet and an outlet each closed by a sealing liquid through which objects may pass, of a conveyer extending successively through the inlet, the chamber and the outlet; means on the conveyer for gripping an object to convey it in a predetermined position through the chamber, puncturing means arranged for engaging the object while in a predetermined position in the chamber, and thrust receiving means in the chamber opposed to the puncturing means.

5. In an appliance of the character designated, a casing, a fluent means for sealing the casing against external atmospheric conditions, means for conveying objects through the casing while so sealed, and means for manipulating the objects while within the casing.

6. In an appliance of the character designated, a casing, a non-capillary liquid adapted to seal the casing against external atmospheric conditions, means for conveying objects through the casing while so sealed, and means for manipulating the objects while within the casing.

Signed at Chicago, July 18th, 1919.

LAURENCE O. SCHOPP.